US008777071B2

(12) United States Patent
Corral Rodriguez et al.

(10) Patent No.: US 8,777,071 B2
(45) Date of Patent: Jul. 15, 2014

(54) SPARE WHEEL STORAGE ASSEMBLY FOR A VEHICLE

(75) Inventors: Pedro Corral Rodriguez, Castro Urdiales (ES); Ander Gonzalez Sagarzazu, Hendaye (FR)

(73) Assignee: Batz S. Coop, Igorre (ES)

( * ) Notice: Subject to any disclaimer, the term of this patent is extended or adjusted under 35 U.S.C. 154(b) by 121 days.

(21) Appl. No.: 13/528,824

(22) Filed: Jun. 20, 2012

(65) Prior Publication Data

US 2012/0325870 A1 Dec. 27, 2012

(30) Foreign Application Priority Data

Jun. 22, 2011 (ES) .................................. 201131057

(51) Int. Cl.
*B62D 43/04* (2006.01)

(52) U.S. Cl.
USPC ...................................................... 224/42.23

(58) Field of Classification Search
USPC .......................................... 224/42.23; 74/55
See application file for complete search history.

(56) References Cited

U.S. PATENT DOCUMENTS

| | | | | |
|---|---|---|---|---|
| 3,554,415 A * | 1/1971 | Woods | 224/491 |
| 3,865,264 A * | 2/1975 | Kuhns | 414/463 |
| 4,278,191 A * | 7/1981 | Mecham | 224/42.21 |
| 4,428,513 A * | 1/1984 | Delmastro | 224/42.21 |
| 4,884,785 A * | 12/1989 | Denman et al. | 254/389 |
| 4,988,023 A * | 1/1991 | Heathcoat | 224/42.21 |
| 5,076,629 A * | 12/1991 | Peters et al. | 296/37.2 |
| 5,197,641 A * | 3/1993 | Montgomery, Jr. | 224/42.21 |
| 5,531,558 A * | 7/1996 | Ruescher | 414/463 |
| 5,638,711 A * | 6/1997 | Schotthoefer | 70/259 |
| 5,791,859 A * | 8/1998 | Simnacher | 414/463 |
| 5,954,246 A * | 9/1999 | Golovoy et al. | 224/42.23 |
| 6,079,932 A | 6/2000 | Boucher | |
| 6,092,790 A | 7/2000 | Dobmeier et al. | |
| 6,267,546 B1 | 7/2001 | Oxyer et al. | |
| 6,561,489 B1 * | 5/2003 | Wakefield | 254/323 |
| 8,579,167 B2 * | 11/2013 | Yamada et al. | 224/42.23 |
| 2005/0133550 A1 | 6/2005 | Pino | |
| 2012/0061428 A1 * | 3/2012 | Pedro et al. | 224/42.23 |

FOREIGN PATENT DOCUMENTS

| | | |
|---|---|---|
| EP | 1076001 A2 | 2/2001 |
| EP | 2070808 B1 | 3/2011 |
| ES | 2223689 T3 | 3/2005 |
| ES | 2365544 T3 | 6/2009 |
| GB | 1120909 A | 7/1968 |
| GB | 1185550 A | 3/1970 |

OTHER PUBLICATIONS

Report on the State of the Art for National Patent Application No. 201131057 issued by the Spanish Office of Patents and Trademarks, dated Apr. 2, 2012, pp. 1-7., Madrid Spain. (2 pages of the Spanish search report is included with an English translation of the Written Opinion).

* cited by examiner

*Primary Examiner* — Brian D Nash

(74) *Attorney, Agent, or Firm* — Tim L. Kitchen; Peter B. Scull; Hamilton, DeSanctis & Cha LLP

(57) ABSTRACT

A unit for picking up and lowering a spare wheel on a vehicle. In one implementation the unit comprises a main shaft, a mechanism with a shaft of rotation for winding or releasing the cable, which is connected at one end to the main shaft, and at the other to the mechanism, a safety actuator that acts on the main shaft and is connected to the mechanism by a connection means. A drive means connects the mechanism and the connection means, and cooperates with the safety actuator, releasing it, in a combined rotation and displacement movement.

12 Claims, 4 Drawing Sheets

SPARE WHEEL STORAGE ASSEMBLY FOR A VEHICLE

CROSS-REFERENCE TO RELATED APPLICATIONS

This application relates to and claims priority to Spanish Patent Application No. P201131057, filed Jun. 22, 2011.

TECHNICAL FIELD

This invention relates to units for picking up and lowering spare wheels on vehicles.

BACKGROUND

There are known units in the prior art designed for their use on vehicles, and more specifically units designed to participate in picking up or releasing a spare wheel in the vehicle, which is disposed beneath the chassis (or on the underside) of the vehicle.

Units of this type comprise a main shaft that extends vertically and passes through a central hole of the wheel, a support in which the wheel is supported and is connected to the main shaft, it being capable of being released in order to make the wheel available, and a cable that is connected at one end to the main shaft and at the other end to a mechanism that is disposed with a shaft of rotation on which the user acts with a tool to pick up or release the wheel.

Units of this type comprise a safety system that consists of an actuator, usually in the shape of a hook, that closes and acts on the main shaft when the wheel has been disposed against the chassis of the vehicle, and is connected to the mechanism by a connection means, so that when an unwanted effect occurs such as the cable breaking, the main shaft comes away and starts to fall but is supported because the hook of the safety actuator supports it. As a result of this there must be an auxiliary safety mechanism that enables the hook to be released from its action with the main shaft, acting on the mechanism, and the user may release the wheel.

U.S. Pat. No. 6,092,790 discloses a unit of this type. In it is disclosed a mechanism for releasing the auxiliary safety device of the spare-wheel-picking up unit, in which in order to release the hook of the safety actuator that is acting on the main shaft, the tool that is used to act on the shaft of rotation of the mechanism is used, it being inserted in a pipe that is found in the mechanism in order to access its shaft. Inside the pipe there is disposed a cam that interrupts the path of the tool, with the result that as the tool passes to reach the shaft of rotation the cam is rotated, the rotation causing the traction of a cable connected at one end to the cam and at the other end to the hook of the safety actuator, which is released from the main shaft.

SUMMARY OF THE DISCLOSURE

A unit for picking up and lowering spare wheels on vehicles is provided that increases safety in the holding of a spare wheel and which improves ergonomics for the user by reducing the effort required to release the hook from the safety actuator of the unit.

The unit for picking up spare wheels of the invention is designed for its use in vehicles, and more specifically for its use in the picking up (or releasing) of spare wheels of the vehicles. The unit comprises a main shaft extended vertically and which is surrounded by the spare wheel during its picking up. The unit also comprises a cable fixed to the main shaft at one end and attached at the other end to a mechanism with a shaft of rotation to wind or release the cable and therefore pick up or lower the wheel.

The unit also comprises a safety actuator that acts on the main shaft by means of a hook that closes and acts on the shaft when the wheel has been disposed against the chassis of the vehicle. The hook being connected to the winding mechanism by a connection means, with the result that when an unwanted effect occurs, such as the cable breaking, the main shaft is supported because the hook of the safety actuator supports it.

The unit also comprises a drive means that is found in the mechanism and connects it to the connection means, with the result that it cooperates with the safety actuator, releasing it, by means of a displacement and rotation movement. There is thus made available a device that as well as being operated by the tool on accessing the shaft of rotation of mechanism and thereby acting as a means of releasing of the safety actuator, the movement caused in the device combines rotation and displacement, which causes an improvement in ergonomics for the user as the lever arm applied on the device is increased, causing an increase in the force applied to the connection means and this in turn on the safety actuator, and this causing a reduction in the effort needed to release the hook from the safety actuator of the unit.

These and other advantages and characteristics of the invention will be made evident in the light of the drawings and the detailed description thereof.

DETAILED DESCRIPTION

Figure 1:
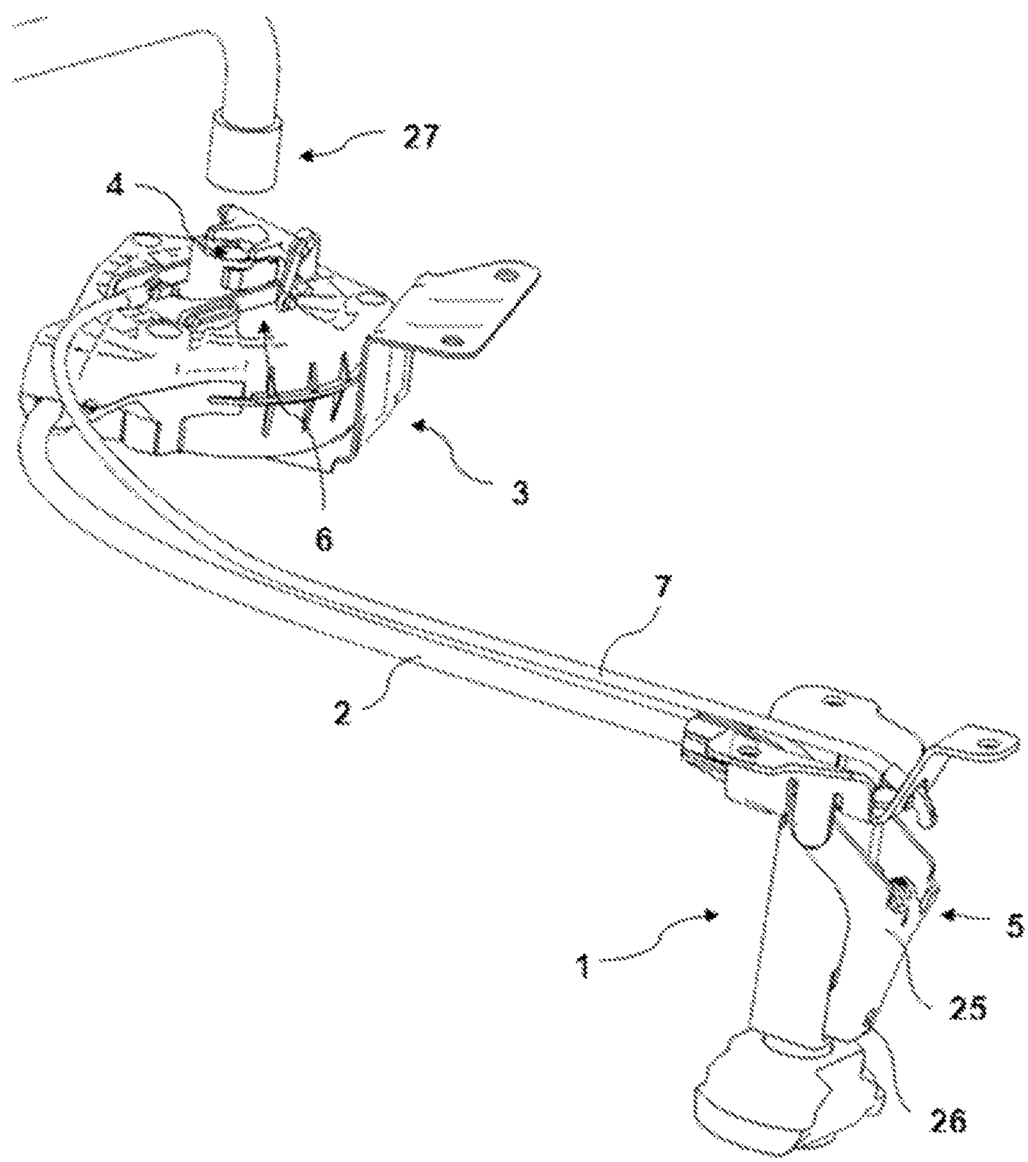
FIG. 1 shows a view in perspective of an embodiment with the drive means in an active position and the safety actuator acting in the main shaft.
Figure 2:
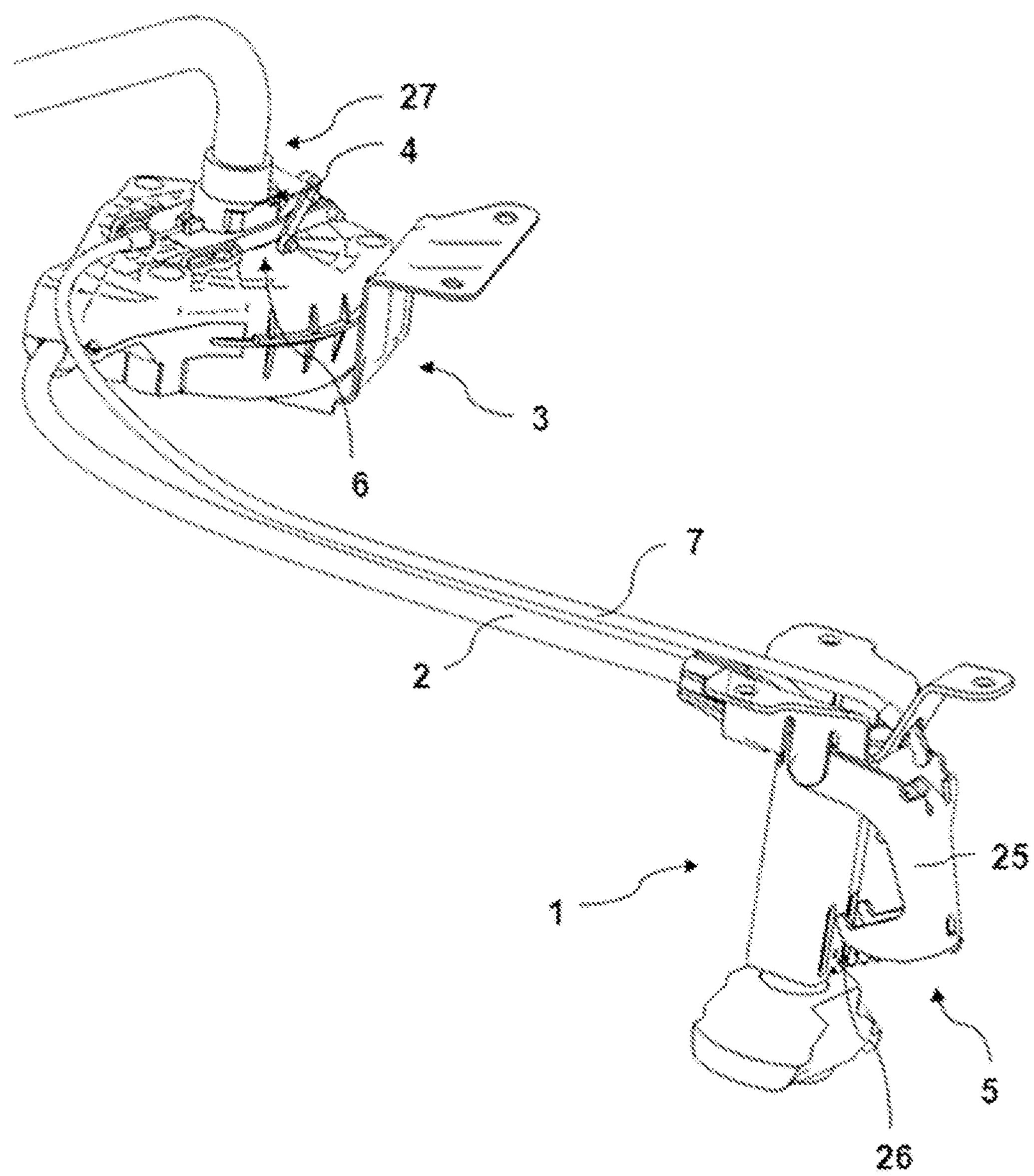
FIG. 2 shows a view in perspective of the unit of FIG. 1, with the drive means in a non-active position and the safety actuator released from the main shaft.

FIGS. 1 and 2 show a view in perspective of an embodiment of the unit of the invention, a unit designed for its use in vehicles, and more specifically a unit designed to pick up or release a spare wheel of the vehicle, which is disposed beneath the chassis (or on the underside) of the vehicle. The unit comprises a main shaft 1 that extends vertically and passes through a central hole of the wheel (not shown in the figure), the main shaft 1 comprising a support on which the wheel is supported.

The unit also comprises a mechanism 3 that enables the winding or releasing of a cable 2 that is connected at one end to the mechanism 3 and at the other to the main shaft 1. The mechanism 3 has a shaft of rotation 4 for performing the action of winding or releasing the cable 2. The shaft of rotation has one end 24 that is accessed with a tool 27 for operating the shaft of rotation 4. The unit also comprises a safety actuator 5 that acts on the main shaft 1 by means of a hook 25 that closes on the main shaft 1, when the wheel is up against the chassis of the vehicle. When an unwanted effect occurs, for example when the cable 2 breaks, the main shaft 1 comes away but immediately catches against the hook 25 of the safety actuator 5 and the wheel is suspended. The hook 25 is closed on the main shaft 1 due to a spring 26 that keeps it in position, and is connected to the mechanism 3 by a connection means 7 such as a cable or towrope, there being in the mechanism 3 a device that enables the hook 25 to be released when the user needs to access the wheel.

The units also comprises a drive means 6, disposed in the mechanism 3, which connects the mechanism 3 and the connection means 7, and cooperates with the safety actuator 5 causing its release in a movement that combines rotation and displacement. In the unit the drive means 6, when the safety actuator 5 is acting on the main shaft 1, moves in a direction pulled by the connection means 7, which in turn is pulled by the spring 26 of the hook 25 of the safety actuator 5 towards the main shaft 1, and moves in an opposite direction when the user acts with the tool 27 in order to release the safety actuator 5.

Figure 3:
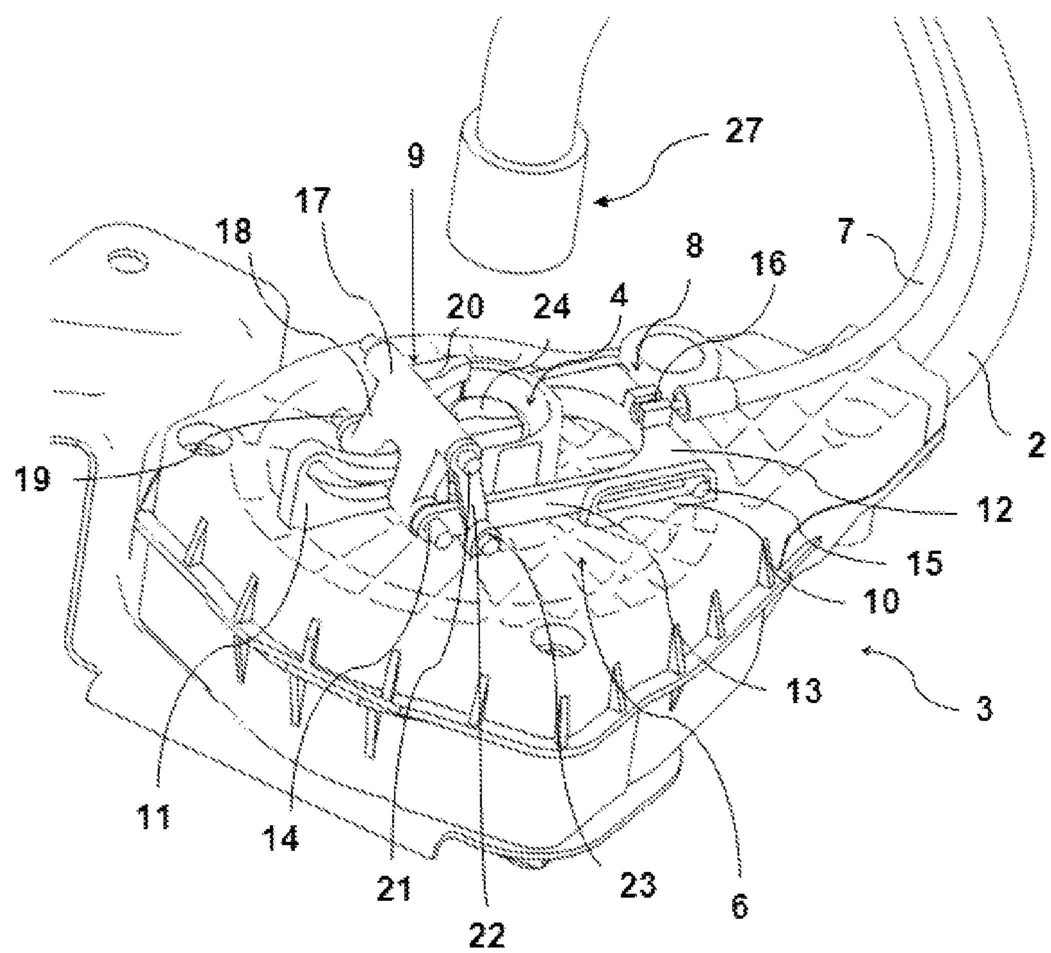
FIG. 3 shows a view in perspective of the drive means of the unit of FIG. 1 in an active position.
Figure 4:
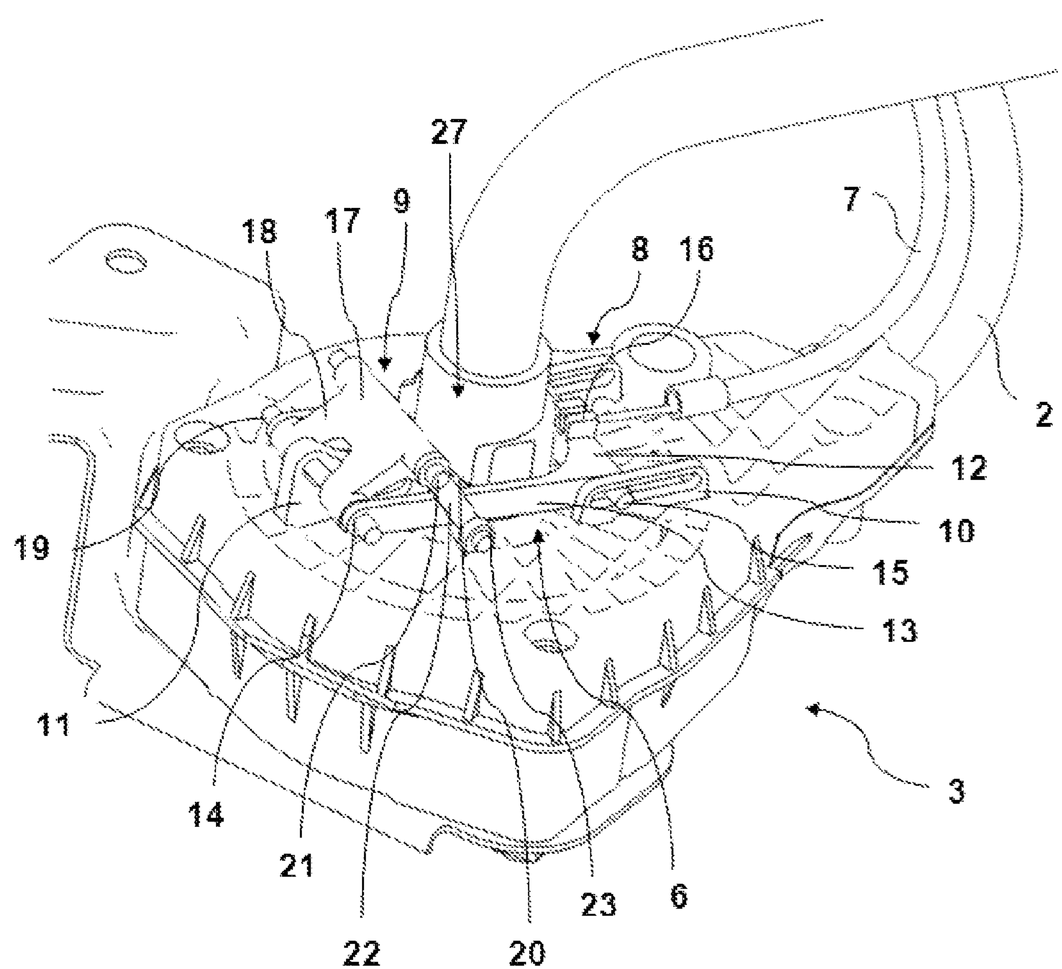
FIG. 4 shows a view in perspective of the drive means of the unit of FIG. 1 in a non-active position.

As shown in FIGS. 3 and 4, in one implementation the drive means 6 is a device that comprises a displacement support 8 and a cam 9. In order for the drive means 6 to move and act on the safety actuator 5, it requires additional members that allow it to do so. In the embodiment of FIGS. 1-4, the members are generally disposed on the cover that covers the mechanism 3.

In the embodiment depicted in FIGS. 1-4 the mechanism 3 comprises two substantially horizontal guides 10 of the displacement support 8, located on one side of the shaft of rotation 4 on the side where the connection means 7 is accessed and symmetrical in relation to the longitudinal axis of the shaft of rotation 4. It also comprises at least one cam guide 11 located on the other side of the shaft of rotation 4, diametrically opposite the guides 10 of the displacement support 8, and centered on the longitudinal axis of the shaft of rotation 4. This cam guide 11 has a shape that, starting from the side of the shaft of rotation 4, gradually moves from a descending shape to a substantially flat central part in order to end in a third part with the shape of an ascending curve.

The displacement support 8 comprises a central body 12 centered on the longitudinal axis of the shaft of rotation 4, with two side arms 13 that surround the shaft of rotation 4 and are disposed with pivoting connections 14 on their ends. It also comprises a shaft 15 incorporated into the central body 12 in a transverse direction to the longitudinal axis of the displacement support 8, with ends that project out of the support and slide in the guides 10 of the displacement support 8, and comprises a housing 16 disposed in the central body 12, preferably in its center, in which is housed one end of the connection means 7.

In one implementation the cam 9 is located on the side of the shaft of rotation 4 diametrically opposite the location of the connection of the connection means 7, and centered on its axis in the longitudinal axis of the shaft of rotation 4. The cam 9 comprises an arm 17 with two side levers 18 with a shaft 19 fitted between the ends of the levers 18, the shaft 19 sliding in the cam guide 11, the ends of the shaft 19 being connected in a pivoting manner with the pivoting connections 14 of the side arms 13 of the displacement support 8. The cam 9 also comprises in one implementation a fork-shaped arm 20 with two side arms, which is connected rigidly to the arm 17 in a shaft of rotation 21 forming an angle between both arms 17, 20, preferably between 90° and 180°. In addition the cam 9 also comprises two arms 22 connected in a pivoting manner at one end to the ends of the shaft of rotation 21, and connected in a pivoting manner at the other end to the housings 23 situated on mechanism 3.

The drive means 6 is in an active position when the safety actuator 5 is acting on the main shaft 1, The drive means 6 being moved and pulled by the connection means 7, which in turn is pulled by the spring 26 of the hook 25 of the safety actuator 5 towards the main shaft 1. In one implementation the fork-shaped arm 20 of the cam 9 covers the position of the end 24 of the shaft of rotation 4, inhibiting access by the tool 27.

The drive means 6 is in a non-active position when it is moved in a direction away from the main shaft 1, and in this position the fork-shaped arm 20 of the cam 9 does not cover the position of the end 24 of the shaft of rotation 4, allowing access to the tool 27 the user uses to act on the end 24 of the shaft of rotation 4 and release the spare wheel. When the user wishes to act with the tool 27 on the end 24 of the shaft of rotation 4 of the mechanism 3, in order to release the safety actuator 5 and release the spare wheel, the user pushes with the tool 27 on the arm 20, forcing it to rotate until it no longer covers the position of the end 24 of the shaft of rotation 4. This rotation causes the displacement of the connection means 7, which acts on the spring 26 of the hook 25, releasing the safety actuator 5.

The passage from an active position to a non-active position of the drive means 6 is achieved by applying with the head of the tool 27 a downwards force, in the direction of the longitudinal axis of the shaft of rotation 4, on the arm 20 of the cam 9, forcing it to rotate. The rotation causes a lever arm or torque in the cam 9 that increases gradually, as the cam 9 rotates on the shaft of rotation 21, which is displaced simultaneously, as it pivots with the arms 22 on the housings 23, increasing the distance between the shaft of rotation 21 and the point of application of the tool 27.

As the application of the force with the tool 27 takes place, the displacement of the shaft of rotation 21 occurs and the cam 9 is displaced as a result, causing a significant sliding of the shaft 19 in the cam guide 11 and a small rotation of the cam 9, enabled by the descending and substantially flat shape of the two first parts of the cam guide 11. In this first phase of movement the displacement of the cam 9 causes the central body 12 to be moved in a direction away from the main shaft 1. This movement of the central body 12 resulting in a force being applied to the connection means 7 in a direction opposite to the force applied by spring 26 of actuator 25. In this first phase of movement the opposition of the hook 25 of the safety actuator 5, caused by the spring 26 that keeps it in its position, is smaller and the torque applied to the cam 9 is also smaller. As the force continues to be applied on the cam 9, the torque applied is greater, as the distance between the point of application of the force and the shaft of rotation 21 of the cam 9 has increased, and the cam 9 continues to slide with the shaft 19 on the cam guide 11, continuing in the third part in an ascending curve of the cam guide 11. In this part of the cam guide 11, the cam 9 rotates significantly and is displaced a small distance, this movement resulting in a continued movement of the central body 12 away from the main shaft 1, the movement being enabled by the fact that the torque applied on the cam 9 is greater when the opposition of the hook 25 of the safety actuator 5 is also greater in this final part of the path, due to the increase in force of the spring 26. As a result the cam 9 rotates until the position of the end 24 of the shaft of rotation 4 is accessed, causing the displacement of the connection means 7 and releasing the safety actuator 5.

As a result a spare-wheel-picking up unit is made available, wherein the drive means 6 is a device that must be operated by the tool 27 of the user, on accessing the shaft of rotation 4 of the mechanism 3, in order to thereby act as a release means of the safety actuator 5.

The movement caused in the drive means 6 on operating it with the tool 27 combines rotation and displacement, which results in an improvement in the ergonomics for the user. This is due to the fact that as the lever arm applied on the cam 9 of the drive means 6 is increased, the user may overcome with less effort the resistance offered by the hook 25 of the safety actuator 5, particularly in the final stage of its release, where the spring 26 that keeps the hook 25 in its position is more extended and therefore exerts greater force, causing an increase in the force on the connection means 7, which in turn is applied on the hook 25 of the safety actuator 5, causing its release.

There is also a considerable saving in the space and volume occupied by the unit of the invention compared with other units of the prior art. As the rotation and the displacement of the drive means 6 are combined in one movement, the space is reduced and the unit occupies a smaller volume.

What is claimed is:

1. An apparatus for storing a spare wheel on a motor vehicle comprising:

a first mechanism attached to the motor vehicle and including:

a vertically disposed main shaft that is adapted to support the load of the spare wheel, the main shaft moveable between a first vertical position where the spare wheel is in a stored position and second vertical position lower than the first vertical position where the spare wheel is in an accessible position;

a hook pivotal between first and second angular positions, in the first angular position the hook engages with the main shaft to substantially limit the main shaft to the first vertical position, in the second angular position the hook is disengaged with the main shaft to permit the main shaft to be moved to the second vertical position, the hook being biased by a spring toward the first angular position;

a second mechanism coupled to the first mechanism by first and second cables, each of the first and second cables having a first end and a second end, the first end of the first cable coupled to the main shaft, the first end of the second cable coupled to the pivotal hook, the second mechanism including:

a winding assembly located within a housing and coupled to the second end of the first cable, the winding assembly comprising a rotating shaft adapted to receive a tool, the rotating shaft rotatable upon the application of a rotational force applied by the tool;

a longitudinal body translatable on the winding assembly housing between a first position and a second position, the second end of the second cable attached to a first side of the longitudinal body so that when the longitudinal body is in the first position the hook assumes the first angular position as a result of the hook being biased by the spring toward the first angular position, when the longitudinal body is moved away from the first position toward the second position the longitudinal body acts on the second end of the second cable to urge the hook toward the second angular position;

a cam assembly coupled to a second side of the longitudinal body opposite the first side, the cam assembly having a first part coupled to and angularly displaceable along with a first shaft of rotation of the cam assembly, the first part angularly displaceable between a first angular position and a second angular position, when the first part is in the first angular position the longitudinal body is in the first position and the first part inhibits tool access to the rotating shaft, when the first part is in the second angular position the longitudinal body is in the second position with the first part permitting tool access to the rotating shaft, when the first part rotates from the first angular position to the second angular position the cam assembly simultaneously acts upon the longitudinal body to cause the longitudinal body to translate away from the first position the second position and to cause the first shaft of rotation to move away from the rotating shaft.

2. The apparatus according to claim 1, wherein the cam assembly comprises a cam arm having an upper portion and a lower portion, the first part extending from the upper portion, the upper portion connected to the winding assembly housing by a link, the link having a first end pivotal with respect to the winding assembly housing and a second end pivotally coupled to the upper portion of the cam arm about the first shaft of rotation, the lower portion of the cam arm having a cam shaft extending there through transverse to the longitudinal body, the cam shaft having a central axis, the longitudinal body comprising a longitudinally extending side arm that is guided at a first end by a longitudinal grooved guide, a second end of the side arm is pivotally coupled to the lower portion of the cam arm about an axis that is common with the central axis of the cam shaft, at least a portion of the cam shaft being situated within a groove of a longitudinal cam guide, the groove delimiting the movement of the longitudinal body between the first and second positions.

3. The apparatus according to claim 2, wherein the cam guide comprises an elongate groove having a first section located nearest the rotating shaft, a third section located furthest from the rotating shaft and a second section located between the first and third sections, the first section having a descending curve shape, the second section being substantially flat and the third section having an ascending curve shape.

4. The apparatus according to claim 2, wherein the second end of the side arm is pivotally coupled with the cam shaft.

5. The apparatus according to claim 2, wherein the cam guide is centered orthogonally to the axis of rotation of the rotating shaft.

6. The apparatus according to claim 2, wherein an angle between the cam arm and the first part is between about 90 degrees and 180 degrees.

7. An apparatus comprising:

a rotating shaft located within an opening of a housing, a longitudinal body moveable laterally across an external surface of the housing between a first lateral position and a second lateral position and having a first side for attaching the end of a cable, a cam assembly coupled to a second side of the longitudinal body opposite the first side, the cam assembly having a first part that is rotatable about a first axis of rotation between a first angular position and a second angular position, when the first part is in the first angular position the longitudinal body is in the first lateral position and the first part at least partially covers the opening, when the first part is in the second angular position the longitudinal body is in the second lateral position and the first part does not cover the opening, upon the first part being rotated from the first angular position to the second angular position the cam assembly is caused to operate on the longitudinal body to move the longitudinal body from the first lateral position to the second lateral position.

8. The apparatus according to claim 7, wherein the cam assembly comprises a cam arm having an upper portion and a lower portion, the first part extending from the upper portion, the upper portion connected to the surface by a link, the link having a first end pivotal with respect to the surface and a second end pivotally coupled to the upper portion of the cam arm about the first axis of rotation, the lower portion of the cam arm having a cam shaft extending there through transverse to the longitudinal body, the cam shaft having a central axis, the longitudinal body comprising a longitudinally extending side arm that is guided at a first end by a longitudinal grooved guide, a second end of the side arm is pivotally coupled to the lower portion of the cam arm about an axis that is common with the central axis of the cam shaft, at least a portion of the cam shaft being situated within a groove of a longitudinal cam guide, the groove delimiting the movement of the longitudinal body between the first and second lateral positions.

9. The apparatus according to claim 8, wherein the cam guide comprises an elongate groove having a first section located nearest the opening, a third section located furthest from the opening and a second section located between the first and third sections, the first section having a descending curve shape, the second section being substantially flat and the third section having an ascending curve shape.

10. The apparatus according to claim 8, wherein the second end of the side arm is pivotally coupled with the cam shaft.

11. The apparatus according to claim 8, wherein the cam guide is centered longitudinally with a center of the opening.

12. The apparatus according to claim 8, wherein an angle between the cam arm and the first part is between about 90 degrees and 180 degrees.

* * * * *